United States Patent Office 2,774,704
Patented Dec. 18, 1956

2,774,704

LAMINATION OF HALOGENATED OLEFIN POLYMERS

Richard A. Smith, Cornwall on the Hudson, N. Y., assignor to The M. W. Kellogg Company, Jersey City, N. J., a corporation of Delaware No Drawing. Application November 27, 1953, Serial No. 394,897

33 Claims. (Cl. 154—139)

This invention relates to a method for laminating halogenated olefin polymers. This invention additionally relates to an adhesive for bonding halogenated olefin polymers to themselves and to other objects. In one of its more particular aspects, this invention relates to a process for bonding fluoroolefin polymers such as trifluorochloroethylene, tetrafluoroethylene, and perfluorobutadiene.

The high degree of chemical stability and the unusual physical characteristics of the fluoroolefins has led to their acceptance and use in numerous applications. However, the unusual properties of these materials has made processing into useful end items by standard techniques impossible. Numerous attempts have been made to laminate fluoroolefins, such as trifluorochloroethylene and tetrafluoroethylene, but with little success.

It is an object of this invention, to provide a process for laminating halogenated olefin polymers.

It is another object of this invention to provide an adhesive for use in preparing halogenated olefin polymer laminates.

It is one of the particular objects of this invention to provide a process for adhering or bonding fluoroolefin polymers to metals such as copper, iron, steel, aluminum and brass and to other solid materials, such as glass and porcelain.

It is another particular object of this invention to provide a process for bonding or adhering fluoroolefin polymers to natural textiles such as cotton, canvas and wool, to synthetic organic textiles such as nylon, heat-resistant Orlon (polyacrylonitrile) and Saran (a vinylidene chloride and vinyl chloride copolymer) and to synthetic inorganic textiles such as fiber glass, asbestos, etc.

Various other objects and advantages will become apparent to those skilled in the art on reading the accompanying description and disclosure.

Generally, the above objects are accomplished by applying to or coating the surface of one of the components which is to be bonded or joined, a copolymer of a perfluorochloroolefin, such as trifluorochloroethylene, and another halogenated olefin, such as vinylidene fluoride. The coated surface is then maintained in contact with a surface of the component to which it is to be bonded under slight pressure and at elevated temperatures to produce a laminated structure in which individual components are strongly bonded together.

As was indicated above, the surface of a halogenated polymer component may be bonded to another surface. In general, the process of this invention may be applied to any polymer which contains at least one halogen atom in the recurring monomer unit. For example, this invention is generally applicable to the lamination of halogenated polymers such as vinyl chloride, vinylidene chloride, etc. This invention is particularly applicable to the lamination of fluorine-containing olefinic polymers such as, vinyl fluoride, vinylidene fluoride, trifluorochloroethylene, and tetrafluoroethylene and more particularly to the lamination of perfluoroolefins such as trifluorochloroethylene and tetrafluoroethylene. This invention contemplates lamination of the above described halogenated olefins either in the form of their homopolymers or copolymers. The term polymer as used herein, includes both homopolymers and copolymers.

The surface of the second component to which the above described polymers may be joined or bonded includes the above described polymers themselves and other polymeric and non-polymeric materials. Thus, the polymers which may be bonded by the process of this invention, may be laminated to metals, such as iron, steel, aluminum and brass, and to other solid non-metallic materials such as glass and porcelain. In addition, the second component may be a natural fiber textile, such as cotton, canvas and wool; a synthetic organic textile such as nylon, heat-resistant Orlon (polyacrylonitrile) and to inorganic textiles such as fiberglass, asbestos, etc.

As was indicated above, the copolymers which are suitable for adhesively bonding halogenated olefin polymers are the normally solid copolymers of perfluorochloroolefins which have softening points above about 150° C. and which are soluble in oxygenated organic solvents. This group contemplates trifluorochloroethylene copolymerized with halogenated olefins such as vinyl chloride, vinylidene chloride, vinyl fluoride, vinylidene fluoride and 1,1-fluorochloroethylene. The perfluorochloroolefin constituent, such as trifluorochloroethylene, may comprise between about 5 and about 95 mol percent of the copolymer and preferably comprises between about 20 and about 80 mol percent. The remaining major constituent of the copolymer is another halogenated olefin such as vinylidene fluoride. A particularly suitable adhesive is one which contains above 69 and less than 80 mol percent of trifluorochloroethylene copolymerized with vinylidene fluoride. In some applications, as discussed hereinbelow a copolymer of trifluorochloroethylene containing between about 20 and about 69 mol percent of trifluorochloroethylene copolymerized with vinylidene fluoride, may be preferred.

Since the process of this invention relates to new and novel adhesive compositions and their use, unnecessarily detailed description of the methods of preparation is not warranted. Therefore, only methods of preparation of the preferred adhesive compositions are given although by employing substantially identical polymerization systems and different monomer feed ratios and polymerization times any copolymer in the range contemplated by this invention may be prepared.

The preferred copolymeric adhesive may be prepared by the procedure given below using the following water-suspension type recipe.

| | Parts by weight |
|---|---|
| Water, distilled | 200. |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C.

over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product was 75 percent.

A preferred copolymeric adhesive having elastomeric properties may be prepared using the following water-suspension type recipe.

| | Parts by weight |
|---|---|
| Water, distilled | 200. |
| $CF_2=CFCl$ | [1] 64.5 |
| $CF_2=CH_2$ | [1] 35.5 |
| $K_2S_2O_8$ | 1.0 |
| $Na_2S_2O_5$ | 0.4 |
| $FeSO_4.7H_2O$ | 0.1 |

[1] 50/50 molar.

Catalyst and activator solution was prepared by dissolving 1 part of $K_2S_2O_8$ in 20 parts of water. In still another 20 parts of water, 0.1 part of $FeSO_4.7H_2O$ was dissolved. 140 parts of water were next charged to a silver-lined steel bomb. The aforementioned $K_2S_2O_8$, $Na_2S_2O_5$, and the $FeSO_4.7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of $CF_2=CFCl$ combined in the resulting copolymeric product was 49 percent.

In employing the adhesives of this invention, the adhesive is preferably dissolved or dispersed in a solvent. Suitable solvents or thinners are the oxygenated organic solvents in some of which the binder is completely soluble, while in others it is partially soluble. Thus, the binder is completely soluble in tetrahydrofuran, tetrahydro-2-methyl furan, tetrahydropyran 3-chlorotetrahydrofuran and dioxane. Complete solubility is not essential, hence solvents in which the adhesive is partially soluble may also be used. Among the solvents in which the binder is partially soluble are ethyl acetate, isobutyl propionate, amyl acetate, methyl ethyl ketone, isophorone, di-isobutyl ketone, cyclohexanone, mesityl oxide, 1-chloro 1-nitroethane and 2-chloro 2-nitropropane. These latter solvents when mixed with a solvent in which the binder is completely soluble, will form a solvent mixture which will completely dissolve the binder. (The use of solvent mixtures is desirable in order to control drying rate). A particularly suitable solvent is tetrahydrofuran; a particularly suitable mixture is tetrahydrofuran and dioxane. Preferably equal amounts by volume of each solvent constitute the mixture although the solvent in which the binder is completely soluble may constitute from about 25 percent to about 95 percent of the mixture.

The adhesive is applied to the surface of at least one of the components which is to be bonded by any convenient technique. Thus, the adhesive may be dissolved in a solvent and the resulting solution applied by brushing, spraying, dipping or any other convenient procedure. When used in the form of a solution, the adhesive may constitute between about 1 and about 40% by weight of the solution, preferably between about 5 and about 20% by weight. When a solvent is used, the solvent is preferably evaporated before the adhesive is placed in contact with the second surface since the adhesive dries more readily. Evaporation, before contact is made with the second surface, is preferably achieved by heating at elevated temperatures, up to 100° C., in an oven or by circulating heated air although air-drying at ambient temperatures may be used where time is not a factor. When the solvent is to be evaporated after the surfaces have been contacted the heat used to effect the bond is usually sufficient to effect drying. The adhesive may also be applied in dry form, either as a film or as a powder. If a film is used, the film should be between about 0.5 and 10 mils, preferably between about 1 and about 5 mils in thickness, and should be placed in contact with one of the surfaces which is to be bonded and sealed in place by the application of heat and slight pressure. The copolymeric adhesive may also be placed on one of the surfaces which is to be joined in the form of a loose powder. The amount of powder that is used should be adjusted so as to give a film of about 1 and about 5 mils thick.

After the surface of one of the components has been coated with the copolymeric adhesive, the surface of the second component is brought into contact with the coated portion of the first surface. The resulting assembly is then maintained at an elevated temperature and under slight pressure. A temperature of at least 135° C. and below the decomposition temperature of the materials may be used. Usually, temperature is maintained between about 140° C. and about 300° C., preferably between about 165° C. and about 200° C. A pressure of at least 5 pounds per square inch is necessary although, pressures substantially in excess of 5 pounds per square inch i. e., up to about 25,000 pounds per square inch may be used. No particular advantage results from the use of extremely high pressures. Preferably a pressure between about 20 and about 80 pounds per square inch is used. The time necessary to effect binding is usually between 0.5 seconds and 10 minutes preferably between 10 seconds and 2 minutes.

In order to illustrate the process of this invention, the following examples, which are offered for purposes of illustration and which are not to be construed as unnecessarily limiting, are given.

Example I

A polytrifluorochloroethylene film was coated with a solution of a copolymer of trifluorochloroethylene and vinylidene fluoride (75:25 mol ratio) in tetrahydrofuran. The solvent was allowed to evaporate and the coated surface was placed in contact with another polytrifluorochloroethylene film. This assembly was then heated at a temperature of about 165° C. and a pressure of about 45 pounds per square inch gage. A strong bond was thus produced.

Example II

A polytrifluorochloroethylene film was coated with the copolymer described in Example I. The coated surface thus produced was placed in contact with a copper sheet. This assembly was then heated as described in Example I to produce a coating firmly bonded on copper. This process was repeated using iron, aluminum and brass.

Example III

A polytrifluorochloroethylene film was coated with the copolymer described in Example I. The coated surface was placed in contact with woven fiberglass and the resulting assembly pressed as described above. A firmly bonded laminate was thus produced. This process was then repeated using cotton cheesecloth, heat-resistant Orlon (polyacrylonitrile) and canvas.

Example IV

A polytetrafluoroethylene film was coated with the copolymer described in Example I. The coated surface was placed in contact with another polytetrafluoroethylene film. This assembly was then heated as described in Example I to produce a bonded laminate.

From the above, it can be seen that the process of this invention makes it possible to apply a fluoroolefin polymer coating or protective surface to a wide variety of materials. Thus, many new uses for the fluoroolefin polymers are now possible. For example, by the process of this invention, conveyor belts may be made having as a surface highly resistant fluoroolefin polymers. Tank lining may also be prepared from these laminates. In addition these polymers may be used as insulation in electrical conductors. For example, a polytrifluorochloroethylene or a polytetrafluoroethylene tape may be coated on one surface with the adhesive of this invention and the tape spirally wound around the electrical conductor that is to be insulated. The insulator, thus taped, is then heated under slight pressure, as described above, to produce an impervious insulation.

The laminate produced by the process of this invention as described thus far is strong and highly resistant to the deteriorative action of most environments. However, it is possible and within the scope of this invention to improve the properties of the bond thus produced by a cross-linking action with respect to the copolymeric adhesive. The copolymers which comprises between about 20 and about 69 mol percent of a perfluorochloroolefin such as trifluorochloroethylene are preferred for this case. Cross-linking of the copolymers modifies the properties of the copolymer and enhances its stability for use in certain applications. These cross-linked polymers are insoluble but may swell in solvent, have increased strength, toughness, heat-resistance and greater chemical resistance. Generally, cross-linking of the copolymeric adhesives which are used in this invention, is effected by incorporating within the copolymer a cross-linking agent which may be a peroxy-type compound, a basic metal oxide or an inorganic polysulfide. The peroxy-type compounds include both organic and inorganic compounds which contain oxygen atoms, directly linked to the oxygen atoms and should be stable below about 50° C. or else they will cause cross-linking while they are being blended into the copolymer. Among the organic compounds are the acyl and aryl peroxides and hydroperoxides such as ditertiary butyl peroxide, di-lauryl peroxide, di-benzoyl peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds, are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the polymer containing cross-linking agent be heated for a period of time. Generally, the polymer is heated at a temperature between about 100° C. and about 200° C., depending upon the decomposition temperature of the cross-linking agent, for a period of time between about 1 hour and about 48 hours. Since the incorporation of the cross-linking agent within the copolymer is usually effected by mechanical means which generate heat, the cross-linking agent is preferably added last, that is, after the pigment has been dispersed. A particularly valuable cross-linking reaction employing diamines, such as ethylene diamine, diethylene triamine, hexamethylene diamine, diamino stilbene, etc. is described in application Serial No. 372,159, filed August 3, 1953, by Fred W. West.

Various alterations and modifications of the invention and its aspects may become apparent to those skilled in the art without departing from the scope of this invention.

Having thus described my invention, I claim:

1. A process for bonding a halogenated olefin polymer surface to another surface which comprises applying to at least one of the surfaces a coating comprising a normally solid copolymer of a perfluorochloroolefin and a halogenated olefin selected from the group consisting of vinyl chloride, vinylidene chloride, vinyl fluoride, vinylidene fluoride and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

2. The process of claim 1 wherein the halogenated olefin polymer is trifluorochloroethylene.

3. The process of claim 1 wherein the halogenated olefin polymer is tetrafluoroethylene.

4. The process of claim 1 wherein the halogenated olefin polymer is vinyl chloride.

5. The process of claim 1 wherein the halogenated olefin polymer is vinylidene chloride.

6. The process of claim 1 wherein the halogenated olefin polymer is perfluorobutadiene.

7. A process for bonding a halogenated olefin polymer surface to a metal surface which comprises applying to at least one of the surfaces a coating comprising a normally solid copolymer of a perfluorochloroolefin and a halogenated olefin selected from the group consisting of vinyl chloride, vinylidene chloride, vinyl fluoride, vinylidene fluoride and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

8. The process of claim 7 wherein the metal surface is iron.

9. A process for bonding a halogenated olefin polymer surface to a synthetic organic fiber surface which comprises applying to at least one of the surfaces a coating comprising a normally solid copolymer of a perfluorochloroolefin and a halogenated olefin selected from the group consisting of vinyl chloride, vinylidene chloride, vinyl fluoride, vinylidene fluoride and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

10. The process of claim 9 wherein the synthetic organic fiber surface is a polyacrylonitrile fiber.

11. A process for bonding a halogenated olefin polymer surface to an inorganic fiber surface which comprises applying to at least one of the surfaces a coating comprising a normally solid copolymer of a perfluorochloroolefin and a halogenated olefin selected from the group consisting of vinyl chloride, vinylidene chloride, vinyl fluoride, vinylidene fluoride and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

12. The process of claim 11 wherein the inorganic fiber surface is fiberglass.

13. A process for bonding a halogenated olefin polymer surface to a halogenated olefin polymer surface which comprises applying to at least one of the surfaces a coating comprising a normally solid copolymer of a perfluorochloroolefin and halogenated olefin selected from the group consisting of vinyl chloride, vinylidene chloride, vinyl fluoride, vinylidene fluoride and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

14. The process of claim 13 wherein the halogenated olefin polymer surface is trifluorochloroethylene.

15. A process for bonding a halogenated olefin polymer surface to a natural fiber surface which comprises applying to at least one of the surfaces a coating comprising a normally solid copolymer of a perfluorochloroolefin and halogenated olefin selected from the group consisting of vinyl chloride, vinylidene chloride, vinyl fluoride, vinylidene fluoride, and 1,1-fluorochloroethylene, contacting the coated surface with the surface to which it is to be bonded and maintaining the surfaces in contact at a temperature of at least 135° C. and below the decomposition temperature of said surfaces and said copolymer and a pressure of at least 5 pounds per square inch gage.

16. The process of claim 15 wherein the natural fiber surface is cotton.

17. A process for bonding a fluoroolefin polymer surface to another surface which comprises, applying to at least one of the surfaces a copolymer comprising between about 5 and about 95 mol percent of trifluorochloroethylene and the remaining major constituent being vinylidene fluoride, contacting the coated surface with the surface to which it is to be bonded and maintaining the surfaces in contact under a pressure of at least 5 pounds per square inch gage and a temperature between about 140° C. and about 300° C.

18. A process for bonding a fluoroolefin polymer surface to another surface which comprises applying to at least one of the surfaces a copolymer comprising between about 20 and about 80 mol percent of trifluorochloroethylene and the remaining major constituent being vinylidene fluoride, contacting the coated surface with the surface to which it is to be bonded and maintaining the surfaces in contact under a pressure of at least 5 pounds per square inch gage and a temperature between about 165° C. and about 200° C.

19. A process for bonding a fluoroolefin polymer surface to another surface which comprises, applying to at least one of the surfaces a copolymer comprising between about 20 and about 69 mol percent of trifluorochloroethylene and the remaining major constituent being vinylidene fluoride, contacting the coated surface with the surface to which it is to be bonded and maintaining the surfaces in contact under a pressure of at least 5 pounds per square inch gage and a temperature between about 165° C. and about 200° C.

20. A process for bonding a fluoroolefin polymer surface to another surface which comprises, applying to at least one of the surfaces a copolymer comprising above 69 and below 80 mol percent of trifluorochloroethylene and the remaining major constituent being vinylidene fluoride, contacting the coated surface with the surface to which it is to be bonded and maintaining the surfaces in contact under a pressure of at least 5 pounds per square inch gage and a temperature between about 165° C. and about 200° C.

21. A process for bonding a fluoroolefin polymer surface to another surface which comprises applying to at least one of the surfaces an oxygenated organic solvent and a copolymer comprising between about 20 and about 80 mol percent of trifluorochloroethylene and the remaining major constituent being vinylidene fluoride, evaporating said oxygenated organic solvent, contacting the coated surface with the surface to which it is to be bonded and maintaining the surfaces in contact under a pressure between about 20 and about 80 pounds per square inch gage and a temperature between about 140° C. and about 300° C.

22. The process of claim 21 wherein the oxygenated organic solvent is tetrahydrofuran.

23. The process of claim 21 wherein the oxygenated organic solvent is dioxane.

24. The process of claim 21 wherein the oxygenated organic solvent is ethyl butyl ketone.

25. The process of claim 21 wherein the oxygenated organic solvent is di-isobutyl ketone.

26. The process of claim 21 wherein the oxygenated organic solvent is tetrahydro-2-methyl furan.

27. A process for bonding a fluoroolefin polymer surface to another surface which comprises applying to at least one of the surfaces an oxygenated organic solvent and a copolymer comprising between about 20 and about 80 mol percent of trifluorochloroethylene and the remaining major constituent being vinylidene fluoride, evaporating said oxygenated organic solvent and subsequently contacting the coated surface with the surface to which it is to be bonded and maintaining the surfaces in contact under a pressure of between about 20 and about 80 pounds per square inch gage and a temperature between about 140° C. and about 300° C. for a period of time between about 0.5 second and about 10 minutes.

28. A process for bonding a fluoroolefin polymer surface to another surface which comprises applying to at least one of the surfaces an oxygenated organic solvent and a copolymer comprising between about 20 and about 80 mol percent of trifluorochloroethylene and the remaining major constituent being vinylidene fluoride, evaporating said oxygenated organic solvent after contacting the coated surface with the surface to which it is to be bonded and maintaining the surfaces in contact under a pressure of between about 20 and about 80 pounds per square inch gage and a temperature between about 140° C. and about 300° C. for a period of time between about 0.5 second and about 10 minutes.

29. A process for bonding a trifluorochloroethylene polymer surface to another surface which comprises applying to at least one of the surfaces an oxygenated organic solvent and a copolymer comprising between about 20 and about 80 mol percent of trifluorochloroethylene and the remaining major constituent being vinylidene fluoride, evaporating said oxygenated organic solvent, contacting the coated surface with the surface to which it is to be bonded and maintaining the surfaces in contact under a pressure of at least 5 pounds per square inch gage and a temperature between about 140° C. and about 300° C. for a period of time between about 0.5 second and about 10 minutes.

30. A process for bonding a trifluorochloroethylene polymer surface to a fiberglass fabric surface which comprises applying to at least one of the surfaces an admixture of tetrahydrofuran and a copolymer comprising above 69 and below 80 mol percent of trifluorochloroethylene and the remaining major constituent being vinylidene fluoride, evaporating the tetrahydrofuran, contacting the coated surface with the surface to which it is to be bonded and maintaining the surfaces in contact under a pressure of between about 20 and about 80 pounds per square inch gage and a temperature between about 165° C. and about 200° C. for a period of time between about 0.5 second and 10 minutes.

31. A laminated structure comprising a layer of a trifluorochloroethylene polymer and a layer of a synthetic organic textile bonded together by a copolymer comprising between about 20 and about 80 mol percent of trifluorochloroethylene and the remaining major constituent being vinylidene fluoride.

32. A laminated structure comprising a layer of a trifluorochloroethylene polymer and a layer of a polyacrylonitrile textile bonded together by a copolymer comprising between about 20 and about 80 mol percent of trifluorochloroethylene and the remaining major constituent being vinylidene fluoride.

33. A laminated structure comprising a layer of a trifluorochloroethylene polymer and a layer of a polyamide textile derived from the reaction of adipic acid and hexamethylenediamine bonded together by a copolymer comprising between about 20 and about 80 mol percent of trifluorochloroethylene and the remaining major constituent being vinylidene fluoride.

References Cited in the file of this patent

UNITED STATES PATENTS

| | | |
|---|---|---|
| 2,392,388 | Joyce | Jan. 8, 1946 |
| 2,484,484 | Berry | Oct. 11, 1949 |
| 2,539,329 | Sanders | Jan. 23, 1951 |
| 2,705,691 | Panagrossi et al. | Apr. 5, 1955 |

FOREIGN PATENTS

| | | |
|---|---|---|
| 660,398 | Great Britain | Nov. 7, 1951 |

OTHER REFERENCES

Modern Plastics, October 1948, pages 168, 170, 172.